Feb. 1, 1966  F. LEVY  3,233,089
ANTI-DAZZLING HEADLIGHTS FOR AUTOMOBILES
Filed April 22, 1964
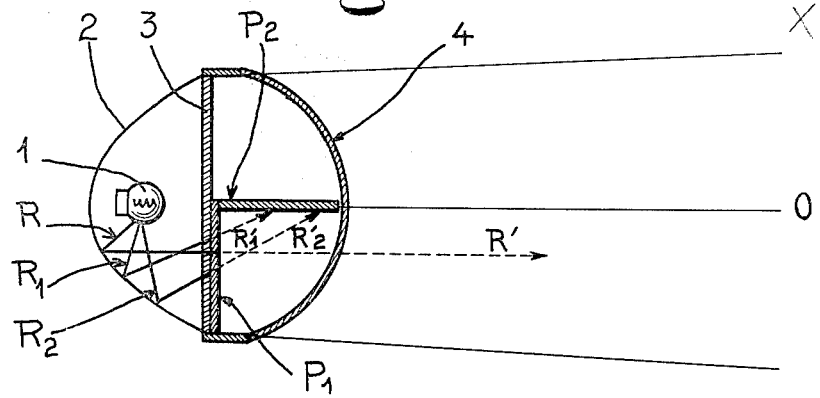
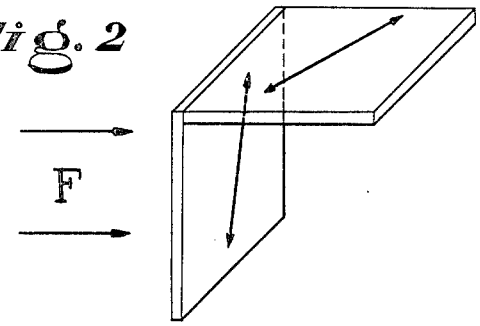
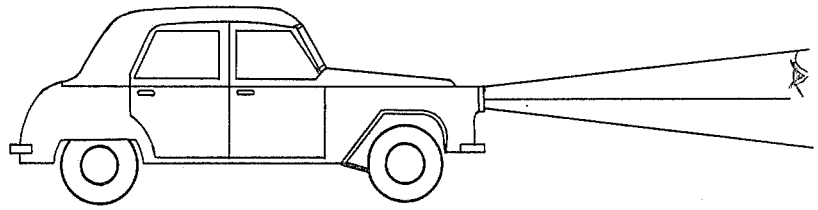
INVENTOR
FELIX LEVY
BY  Irwin S. Thompson
ATTORNEY

United States Patent Office 3,233,089
Patented Feb. 1, 1966

3,233,089
ANTI-DAZZLING HEADLIGHTS
FOR AUTOMOBILES
Félix Levy, Quartier des Colettes, Cagnes-sur-Mer, France
Filed Apr. 22, 1964, Ser. No. 361,661
Claims priority, application France, Apr. 22, 1963, 7,206
3 Claims. (Cl. 240—9.5)

It has already been proposed to provide those headlights for automobiles and the like vehicles which remain dazzling, even when the dim lights have been switched on, by reason of the light diffused by the upper section of the parabolic reflector being reflected upwardly by the lower section of the latter, with a system of two polarizing screens arranged within the reflector so as to extinguish such upwardly reflected beams.

My invention has for its object an anti-dazzling headlight resorting to two polarizing screens, which screens are inserted in a novel manner which cuts out the movable screening means serving hitherto for the switching on of the dim lights and their operation and furthermore extinguish a fraction of the light beam reflected by the lower half of the reflector which would otherwise be projected upwardly, while retaining the horizontally or downwardly directed fraction of the beam.

To this end, a polarizing screen being positioned to the front of the lower half of the reflector, in principle in a direction perpendicular to the optic axis of the latter, the second screen the polarizing plane of which lies preferably at 90° with reference to that of the first screen is arranged horizontally or with a slight slope with reference to horizontality to the front of the first screen at the same level as the optic axis or almost so.

With such an arrangement, the light reflected by the lower half of the reflector passes first through the vertical screen and only the fraction of the beam of polarized light which is directed upwardly impinges then on the second screen which extinguishes it whereas the remainder illuminates normally the road. The diffused light from the upper section of the reflector which is reflected upwardly by the lower part of the latter is also extinguished by the second screen.

This novel arrangement allows thus the driver when passing another vehicle to continue illuminating fully with his headlights and retaining the same visibility for the objects and obstacles on the road as before, without it being necessary for him to modify the illumination produced by his headlights.

The accompanying diagrammatic drawings illustrate by way of example a preferred embodiment of my invention. In said drawings:

FIG. 1 is an axial cross-section of the headlight,

FIG. 2 is a perspective view of the arrangement of the two polarizing screens with reference to the impact of the luminous beam in a direction substantially parallel to the arrows F.

FIG. 3 shows the distribution of the light projected by the headlights of a vehicle with reference to a person moving towards the vehicle.

In FIG. 1, 1 designates the bulb, 2 the parabolic reflector, 3 the sheet of refractory glass limiting the heat transmitted to the parts of the headlights located to the front of said sheet.

A first vertical polarizing screen P1 extends to the front of said glass sheet between its lower edge and a level approximating that of the optic axis O while a second polarizing screen P2 forming an analyser extends horizontally or substantially so and forwardly of the upper edge of the vertical polarizing screen P1.

The whole arrangement may be protected by a bulging casing 4 extending to the front of the arrangement described and made of glass or of a transparent plastic material. A light ray R impinging downwardly from the bulb onto the reflector and reflected as illustrated by R' horizontally or underneath a horizontal direction, passes only through the screen P1 so that all the rays similar to R form a beam illuminating the road permanently whereas the rays such as those illustrated at R1 and R2 which are reflected upwardly as shown at R'1 and R'2 meet the analyser P2 which reflects them downwardly or absorbs them, as the case may be.

My improved headlight provides a considerable improvement over the anti-dazzling headlights used hitherto, since with the latter the sudden passage from full illumination to anti-dazzling illumination gives the driver the sudden impression of a dark hole in front of him, which impression has led to many accidents, whereas my improved arrangement provides a constant illumination of the road throughout its extent to the front of the vehicle with a uniform intensity.

Of course, the structure and the flat or incurved shape of the screens as well as the shape of their peripheries and other structural details may vary without widening thereby the scope of my invention as defined by the accompanying claims.

What I claim is:

1. A headlight for automobiles and like vehicles, comprising a concave reflector having a forwardly directed horizontal optical axis and a light source mounted in said reflector and lying substantially on said optical axis, a vertical polarizing screen extending from the lower open end of said reflector upwardly to at least about the horizontal plane passing through said optical axis, and an analyzing screen extending substantially horizontal from said vertical screen forwardly of said vertical screen to arrest the rays directed upwardly from the lower section of the reflector through said vertical screen.

2. A headlight as claimed in claim 1, and a transparent cover closing the forward end of said reflector, said screens being disposed behind said cover.

3. A headlight as claimed in claim 1, said vertical screen terminating at about the level of said optical axis in a first horizontal edge, said analyzing screen terminating rearwardly at a second horizontal edge adjacent said first horizontal edge.

References Cited by the Examiner

UNITED STATES PATENTS

| 1,858,702 | 5/1932  | Chambers | 240—9.5   |
| 2,692,939 | 10/1954 | Crowther | 240—9.5 X |
| 3,124,311 | 3/1964  | Kruger   | 240—9.5 X |

FOREIGN PATENTS

| 1,098,406 | 7/1955 | France.  |
| 928,032   | 5/1955 | Germany. |

NORTON ANSHER, *Primary Examiner.*